United States Patent
de Leon et al.

(10) Patent No.: US 9,959,031 B2
(45) Date of Patent: May 1, 2018

(54) ELECTRONIC DEVICE WITH DYNAMIC POSITIONING OF USER INTERFACE ELEMENT

(75) Inventors: David de Leon, Lund (SE); Fredrik Johansson, Malmo (SE)

(73) Assignee: Sony Mobile Communications Inc, Tokyo (JP)

(*) Notice: Subject to any disclaimer, the term of this patent is extended or adjusted under 35 U.S.C. 154(b) by 903 days.

(21) Appl. No.: 13/978,439

(22) PCT Filed: May 22, 2012

(86) PCT No.: PCT/IB2012/001002
§ 371 (c)(1),
(2), (4) Date: Dec. 19, 2013

(87) PCT Pub. No.: WO2013/175250
PCT Pub. Date: Nov. 28, 2013

(65) Prior Publication Data
US 2014/0092043 A1    Apr. 3, 2014

(51) Int. Cl.
*G06F 3/041* (2006.01)
*G06F 3/0488* (2013.01)

(52) U.S. Cl.
CPC ............ *G06F 3/0488* (2013.01); *G06F 3/041* (2013.01)

(58) Field of Classification Search
CPC ........... G06F 3/0488; G06F 3/041; G06F 3/14
USPC .................... 345/173, 647; 715/251
See application file for complete search history.

(56) References Cited

U.S. PATENT DOCUMENTS

| | | | |
|---|---|---|---|
| 2003/0038754 A1 | 2/2003 | Goldstein et al. | |
| 2011/0018827 A1* | 1/2011 | Wang | G06F 3/0482 345/173 |
| 2012/0032979 A1* | 2/2012 | Blow | G06F 1/1626 345/647 |

(Continued)

FOREIGN PATENT DOCUMENTS

| | | |
|---|---|---|
| EP | 0816979 | 1/1998 |
| EP | 2280339 | 2/2011 |

(Continued)

OTHER PUBLICATIONS

International Search Report and Written Opinion from corresponding International Application No. PCT/IB12/001002, dated Apr. 29, 2013.

*Primary Examiner* — Jennifer Mehmood
*Assistant Examiner* — Carl Adams
(74) *Attorney, Agent, or Firm* — Renner, Otto, Boisselle & Sklar, LLP; Grant Steyer

(57) ABSTRACT

An electronic device includes a display and a touch input disposed over the display. The touch input receives touch inputs from a user and detects location of the user's hand relative to the display including location of the user's hand in front of and not touching the touch input. A controller controls the display of content, including determining an obstructed area of the display that is obstructed from viewing by the user's hand as indicated by the detection made by the touch input; determining that a default location for the display of a new graphical user interface (GUI) element that should be added to the display overlaps with the obstructed area by at least a predetermined amount; and changing a manner in which the new GUI element is displayed so that the new GUI element is not obstructed by the user's hand.

10 Claims, 5 Drawing Sheets

(56) References Cited

U.S. PATENT DOCUMENTS

2012/0062513 A1* 3/2012 Kang .................. G06F 3/044
                                                    345/174
2012/0110442 A1* 5/2012 Sharkey ............. G06T 13/00
                                                    715/251
2013/0285925 A1* 10/2013 Stokes ............. G06F 3/04883
                                                    345/173

FOREIGN PATENT DOCUMENTS

| WO | 20060009972 | 1/2006 |
| WO | 20110007264 | 1/2011 |

\* cited by examiner

ELECTRONIC DEVICE WITH DYNAMIC POSITIONING OF USER INTERFACE ELEMENT

TECHNICAL FIELD OF THE INVENTION

The technology of the present disclosure relates generally to electronic devices and, more particularly, to an electronic device that includes a function to dynamically position a graphical user interface (GUI) element based on the detection of an object that obstructs the element's default location.

BACKGROUND

Electronic devices, such as mobile telephones and tablet computers, are capable of displaying wide ranges of user interface content on a display. Also, many electronic devices include touch-screen functionality that allows the user to interface with the electronic device by touching displayed items. At times during the use of the electronic device, the displayed items may change. For instance, dialog boxes may be added to the displayed content. Dialog boxes often include user interface features that a user may want to interact with by touching. As another example, temporary popups that time-out and disappear (also known as "toasts") may be added to the displayed content for a predetermined amount of time.

If the user's hand obstructs part of the display where the newly added user interface element is added, there is a risk that the user may miss seeing important information. Also, if a user desires to read or interact with the newly added user interface element that is obstructed, then the user may need to move his or her hand to see or interact with the element.

SUMMARY

To enhance user interaction with content displayed on a touch screen, the present disclosure describes techniques for dynamically changing the position and/or display timing of a graphical user interface element that is to be added to the touch screen when it is detected that the user's hand obstructs a default position of the element.

According to one aspect of the disclosure, an electronic device includes a display that displays visual content to a user of the electronic device; a touch input disposed over the display and configured to receive touch inputs from the user that are interactive with the visual content, the touch input configured to detect location of the user's hand relative to the display including location of the user's hand in front of and not touching the touch input; and a controller, the controller configured to control the display of the visual content, including: determine an obstructed area of the display that is obstructed from viewing by the user's hand as indicated by the detection made by the touch input; determine that a default location for the display of a new graphical user interface (GUI) element that should be added to the display overlaps with the obstructed area by at least a predetermined amount; and change a manner in which the new GUI element is displayed so as to improve user visibility of the new GUI element.

According to one embodiment of the electronic device, the change in the manner in which the new GUI element is displayed is a change so that the new GUI is at least partially not obstructed by the user's hand.

According to one embodiment of the electronic device, the change in the manner in which the new GUI element is displayed is moving the location of where on the display that the new GUI element is displayed from the default location to an unobstructed area of the display that is unobstructed from viewing by the user's hand.

According to one embodiment of the electronic device, the unobstructed area includes all areas of the display not included in the obstructed area.

According to one embodiment of the electronic device, the obstructed area is determined by generation of a plot of the locations of the user's hand relative to the display.

According to one embodiment of the electronic device, the location in which the new GUI element is displayed is selected so that there is no overlap between the new GUI element and the obstructed area.

According to one embodiment of the electronic device, the location in which the new GUI element is displayed is selected so that the new GUI element partially overlaps the obstructed area and partially overlaps the unobstructed area.

According to one embodiment of the electronic device, the size of the GUI element is enlarged relative to a default display size of the new GUI element so that the new GUI element is partially displayed in the unobstructed area.

According to one embodiment of the electronic device, the change in the manner in which the new GUI element is displayed is delaying the display of the new GUI element until the obstructed area changes by movement of the user's hand so that the default location no longer overlaps with the obstructed area.

According to one embodiment of the electronic device, the obstructed area is determined by generation of a plot of the relative locations of the user's hand relative to the display.

According to one embodiment of the electronic device, the change in the manner in which the new GUI element is displayed is changing an appearance of the visual content in an unobstructed area of the display to alert the user to the presence of the new GUI element in the obstructed area.

According to one embodiment of the electronic device, the new GUI element is one of a dialog box, a menu, or a temporary popup that times-out and disappears.

According to one embodiment of the electronic device, the touch input is a capacitive touch input and the location of the user's hand in front of and not touching the touch input is determined by changes in capacitance that are detected by the touch input.

According to another aspect of the disclosure, a method of displaying visual content with an electronic device, includes displaying the visual content to a user of the electronic device on a display of the electronic device; receive touch inputs from the user that are interactive with the visual content with a touch input that is disposed over the display, and detecting location of the user's hand relative to the display including location of the user's hand in front of and not touching the touch input; and controlling the display of the visual content, including: determining an obstructed area of the display that is obstructed from viewing by the user's hand as indicated by the detecting of the location of the user's hand; determining that a default location for the display of a new graphical user interface (GUI) element that should be added to the display overlaps with the obstructed area by at least a predetermined amount; and changing a manner in which the new GUI element is displayed so as to improve user visibility of the new GUI element.

According to one embodiment of the method, the change in the manner in which the new GUI element is displayed is a change so that the new GUI is at least partially not obstructed by the user's hand.

According to one embodiment of the method, the change in the manner in which the new GUI element is displayed is moving the location of where on the display that the new GUI element is displayed from the default location to an unobstructed area of the display that is unobstructed from viewing by the user's hand.

According to one embodiment of the method, the unobstructed area includes all areas of the display not included in the obstructed area.

According to one embodiment of the method, the obstructed area is determined by generation of a plot of the locations of the user's hand relative to the display.

According to one embodiment of the method, the location in which the new GUI element is displayed is selected so that there is no overlap between the new GUI element and the obstructed area.

According to one embodiment of the method, the location in which the new GUI element is displayed is selected so that the new GUI element partially overlaps the obstructed area and partially overlaps the unobstructed area.

According to one embodiment of the method, the size of the GUI element is enlarged relative to a default display size of the new GUI element so that the new GUI element is partially displayed in the unobstructed area.

According to one embodiment of the method, the change in the manner in which the new GUI element is displayed is delaying the display of the new GUI element until the obstructed area changes by movement of the user's hand so that the default location no longer overlaps with the obstructed area.

According to one embodiment of the method, the obstructed area is determined by generation of a plot of the relative locations of the user's hand relative to the display.

According to one embodiment of the method, the change in the manner in which the new GUI element is displayed is changing an appearance of the visual content in an unobstructed area of the display to alert the user to the presence of the new GUI element in the obstructed area.

According to one embodiment of the method, the new GUI element is one of a dialog box, a menu, or a temporary popup that times-out and disappears.

According to one embodiment of the method, the touch input is a capacitive touch input and the location of the user's hand in front of and not touching the touch input is determined by changes in capacitance that are detected by the touch input.

According to another aspect of the disclosure, an electronic device includes a display that displays visual content to a user of the electronic device; a camera directed to detect the user when the user's visual attention is directed toward the display; and a controller, the controller configured to control the display of the visual content, including: determine that a new graphical user interface (GUI) element should be added to the display; detect whether the user's visual attention is directed toward the display; and if the user's visual attention is not directed at the display, delay the display of the new GUI element until a detection is made that the user's visual attention is directed at the display.

DETAILED DESCRIPTION OF EMBODIMENTS

Figure 1:
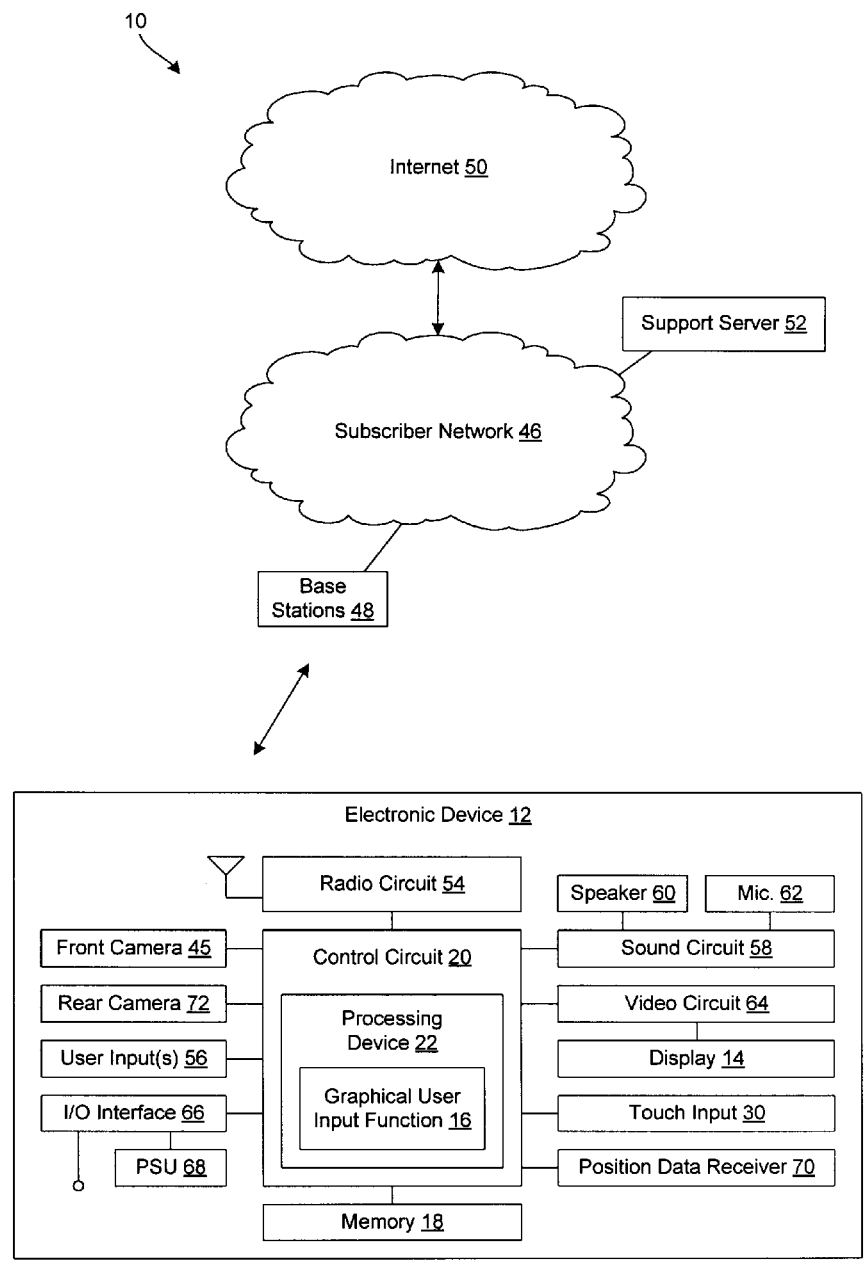
FIG. 1 is a schematic view of an exemplary electronic device having a graphical user interface function and forming part of a communication system.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and methods of displaying graphical user interface (GUI) content on the electronic device. The electronic device is typically a portable electronic device, and may take any form factor including, but not limited to, a tablet computing device, a mobile telephone, a laptop computer, a gaming device, a camera, a television, and a media player. The illustrated examples show a mobile telephone, but applicability of aspects of the invention is not limited to mobile telephones.

Referring to FIG. 1, schematically shown is a communication system 10 in which an electronic device 12 is present. With additional reference to FIGS. 2 and 3, the electronic device 12 includes a display 14. At times, the display 14 is used to display visual content to the user. The specific content that is display is not germane to this disclosure. Exemplary content includes, but is not limited to, messaging screens (screens showing content related to electronic mail, instant messaging, text messaging, etc.), Internet content, calendar screens, file management screens, multimedia screens, and any other content that the electronic device 12 is capable of displaying on the display 14.

In one embodiment, a graphical user interface (GUI) function 16 manages the display of content on the display 14. Typically, the GUI function 16 is embodied in the form of executable logic (e.g., lines of code, software, or a program) that is stored on a non-transitory computer readable medium (e.g., a memory 18) of the electronic device 12 and is executed by a control circuit 20. The described operations may be thought of as a method that is carried out by the electronic device 12. Variations to the illustrated and described techniques are possible and, therefore, the disclosed embodiments should not be considered the only manner of carrying out the disclosed functions. Also, while the appended figures show an exemplary visual arrangement of GUI elements in schematic form, the visual arrangement may be different than that shown. The control circuit 20 is responsible for overall operation of the electronic device 12. The control circuit 20 includes a processor 22 that executes various applications, including the GUI function 16.

Figure 4:
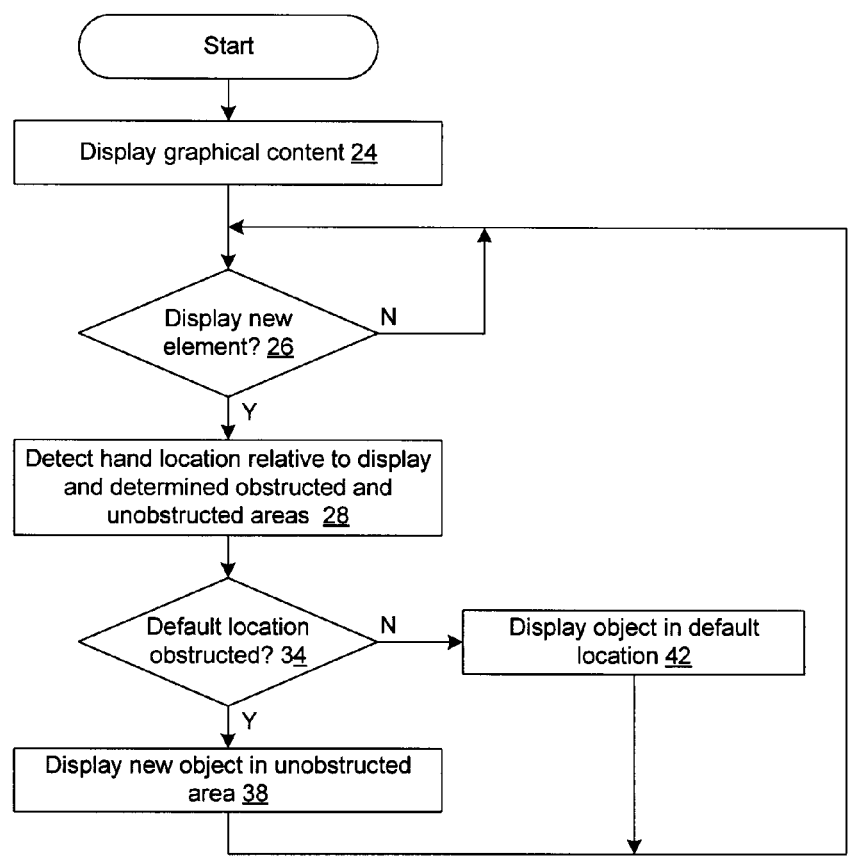
FIG. 4 is a flow diagram of the display operations of the graphical user interface function of the electronic device that are represented by FIGS. 2 and 3.

With additional reference to FIG. 4, illustrated is an exemplary flow diagram representing steps that may be carried out to implement display functionality of the electronic device 12. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may commence in block 24 where content is displayed on the display 14. In block 26, a determination is made as to whether a new GUI element should be displayed. As used herein, the term "new GUI element" includes a GUI element that is not presently shown on the display 14 and is added to the displayed content, and also includes a GUI element that is presently shown on the display 14 and undergoes a change in visual appearance or content. The display of the new GUI element may be prompted by actions taken by the user and/or operation of the electronic device 12 apart from actions taken by the user. The new GUI element presents visual content to the user. The visual content may include informational content that is not interactive and/or may include interactive features such as, but not limited to, selectable buttons, menu options, etc. The new GUI element may take a variety of forms including, but not limited to, a dialog box, a menu, a temporary popup that times-out and disappears (also known as a "toast"), etc.

The logical operation will wait until a positive determination is made in block 26. Upon a positive determination in block 26, the logical flow progresses to block 28. In block 28, the electronic device 12 determines where the user's hand is located relative to the display 14. As used herein, the term "hand" refers to any part of one or both of the user's hands, from a portion of a finger to the entirety of both hands.

In one embodiment, the touch-screen functionality is implemented with a touch input 30 (FIG. 1) that is disposed over the display 14. A common type of touch input 30 is a capacitive touch input. To determine where the user's hand is located relative the display 14, the touch input 30 is used to sense where on the touch input 30 the user is touching the touch input 30 and where the user's hand is located just in front of and within a sensitivity range of the touch input 30 (e.g., within about 2 centimeters), but not touching the touch input 30. To determine the location of the user's hand when just in front of, but not touching, the touch input 30 the capacitive properties of the touch input 30 may be employed as part of an "air touch" detection. "Air touch" detection is a detection of the presence of a user by change in capacitance of the touch input 30 even though the user does not make physical contact with the touch input 30.

From the detection of the presence of the user by actual touching and air touch detection, a composite plot of the location of the user's hand may be derived. The composite plot indicates the parts the display 14 that are obstructed from viewing by the user. An area 30 of the display 14 that is designated as being obstructed by the user may be determined. In the appended figures, the obstructed area 30 is denoted using hatching. In one embodiment, the area 30 includes and/or surrounds the composite plot of the parts of the display 14 relative to which the user's hand is located. For convenience of operation, the obstructed area 30 may be a polygon, such as a rectangle (e.g., the embodiment of FIG. 2) or a more complex shape (e.g., the embodiment of FIG. 5). In other embodiments, the obstructed area 30 is the same as the composite plot and may have curved edges. Also, depending on the detected locations of the user's hand, the obstructed area 30 need not be contiguous. Portions of the display 14 that are outside the obstructed area 30 are considered an unobstructed area 32 of the display 14. For instance, all areas of the display 14 that are not the obstructed area 30 may be considered the unobstructed area 32. The unobstructed area 32 need not be contiguous.

Figure 2:
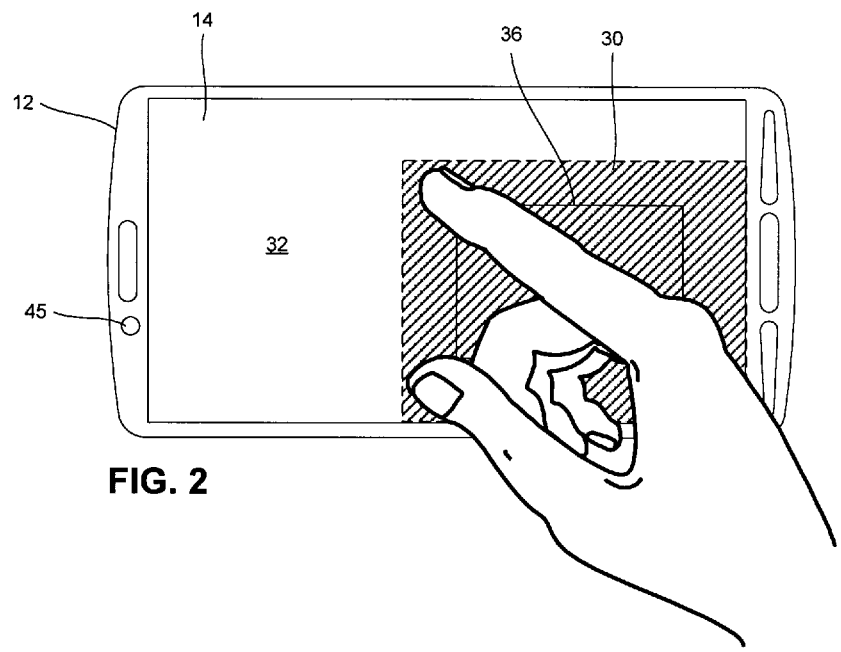
FIGS. 2 and 3 are schematic representations of the electronic device while in use by a user and illustrate dynamic positioning of a graphical user interface element.

Next, in block 34, a determination is made as to whether a default location 36 of the of the new GUI element to be added to the display 14 is located within the obstructed area 30. This condition is represented in FIG. 2. The default location 36 is the location at which the new GUI element would be displayed absent any considerations regarding location of the user's hand. In one embodiment, to reach a positive determination in block 34, the default location of the new GUI element is found to overlap with the obstructed area 30 by at least a predetermined amount. The predetermined amount may be, for example, that the default location 36 of the new GUI element is fully contained within the obstructed area 30. In other implementations, the predetermined amount is an overlap of 25 percent or more of the GUI element with the obstructed area 30, an overlap of 50 percent or more of the GUI element with the obstructed area 30, or some other amount of overlap measured as a percent, as a number of pixels, or some other quantification.

Figure 3:
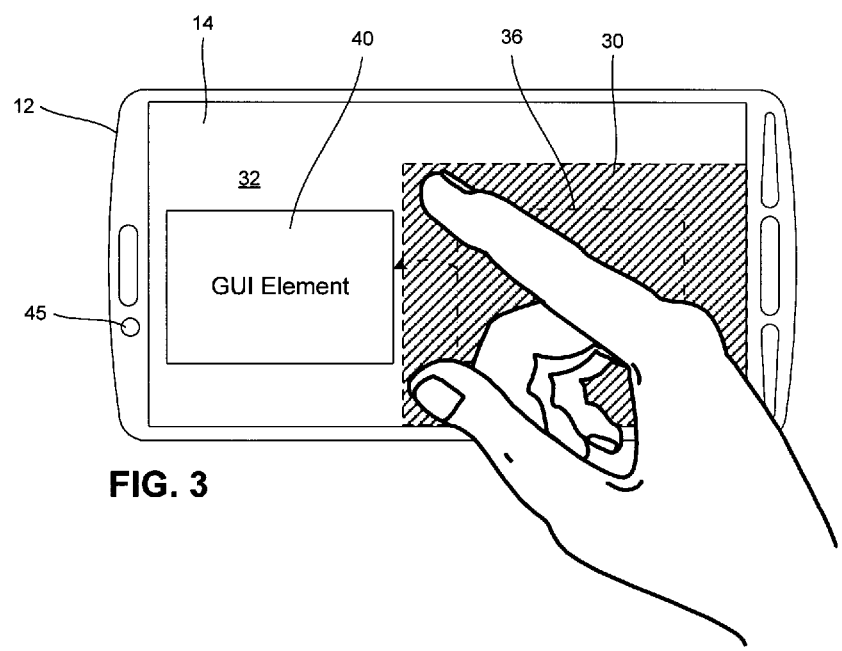

If a positive determination is made in block 34, the logical flow may proceed to block 38 where the new GUI element (denoted by reference numeral 40 in FIG. 3) is added to the display in the unobstructed area 32 and in a location that is different than the default location 36 for the new GUI element 40. The result of this operation is represented in FIG. 3. Depending of the size of the obstructed area 30 and the size of the new GUI element 40, some overlap of the new GUI element 40 and the obstructed area 30 may occur after addition of the new GUI element 40 to the display 14. However, even in this situation, it is contemplated that it will be easier for the user to view and/or interact with the new GUI element 40 due to its change in displayed location relative to the default location for the new GUI element 40. Therefore, in some embodiments or situations, the location in which the new GUI element 40 is displayed is selected so that there is no overlap between the new GUI element 40 and the obstructed area 30. In other embodiments or situations, the location in which the new GUI element 40 is displayed is selected so that the new GUI element 40 partially overlaps the obstructed area 30 and partially overlaps the unobstructed area 32.

In one embodiment, the change in location results from shifting the default location 36 to a new location. In other embodiments, the change in location results from a change in size of the new GUI element 40 (e.g., enlargement of the GUI element 40 in one or more directions relative to a default display size of the GUI element 40) so that a portion of the new GUI element 40 appears in the unobstructed area 30 to draw the user's visual attention.

If a negative determination is made in block 34, the logical flow may proceed to block 42 where the new GUI element 40 is displayed in the default location 36. Following the appropriate one of blocks 38 or 42, the logical flow may return to block 26.

Figure 5:
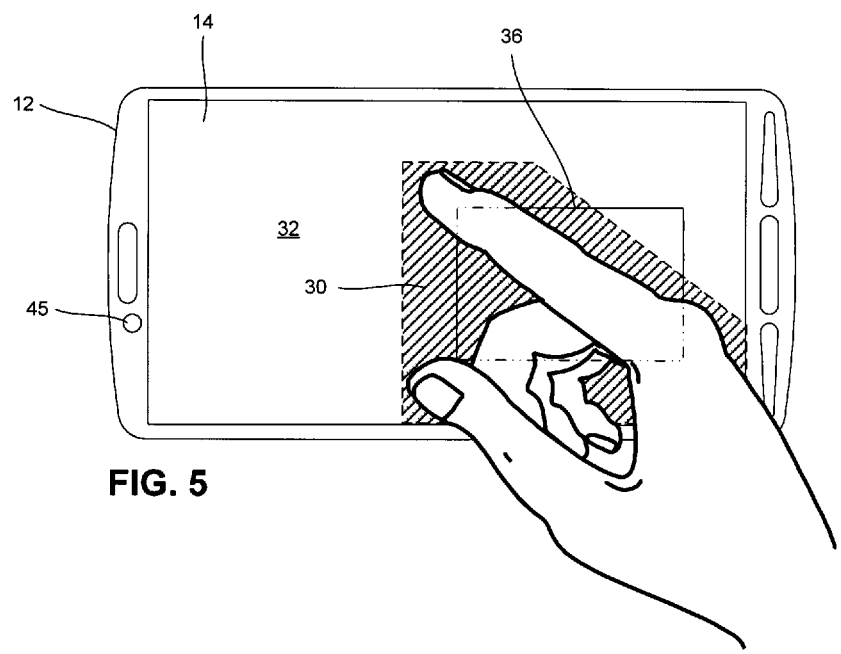
FIGS. 5 and 6 are schematic representations of the electronic device while in use by a user and illustrate dynamic temporal handling of a graphical user interface element.
Figure 6:
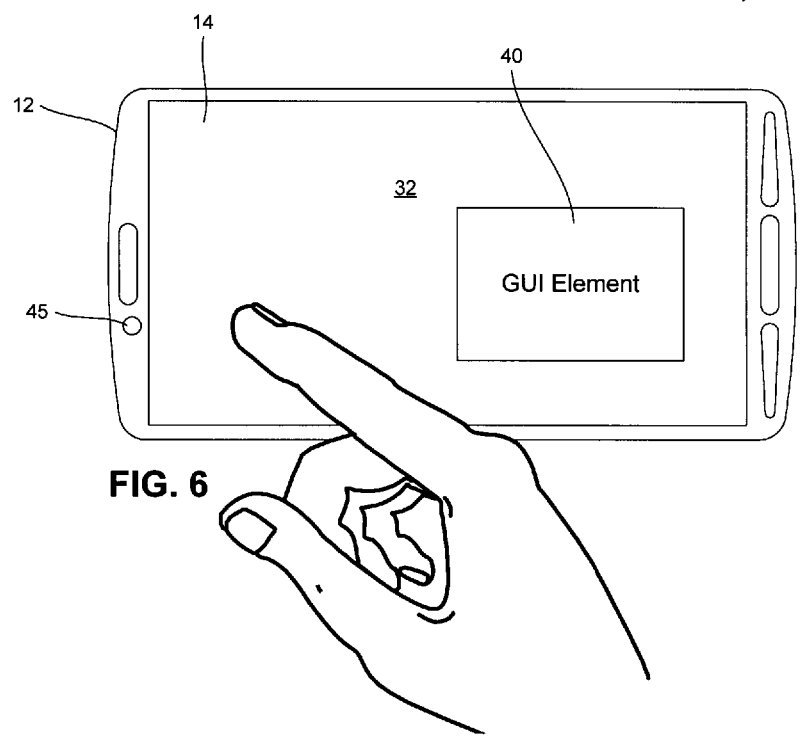
Figure 7:
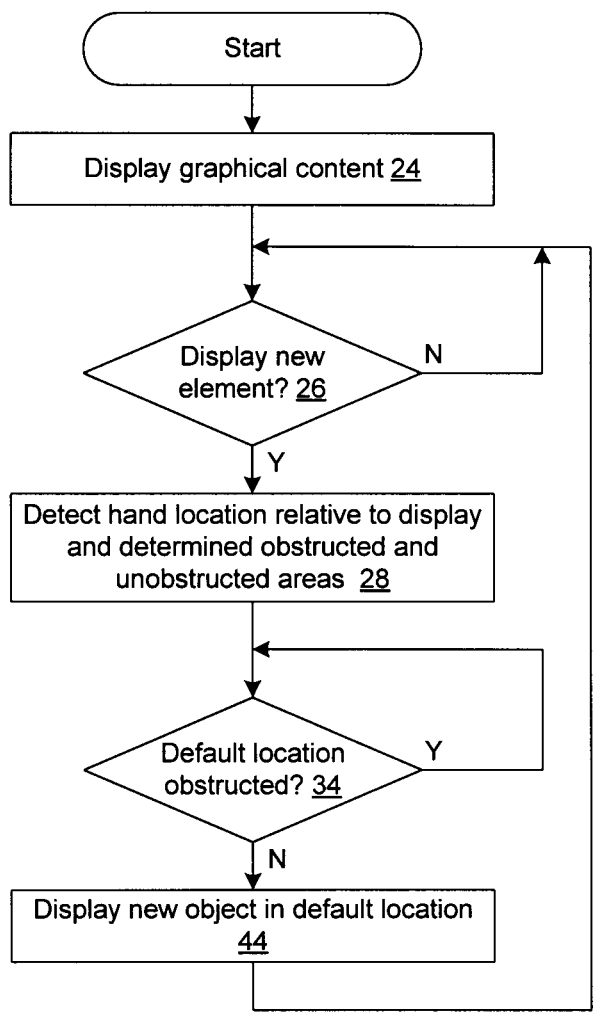
FIG. 7 is a flow diagram of the display operations of the graphical user interface function of the electronic device that are represented by FIGS. 5 and 6.

With additional reference to FIG. 7, and in conjunction with the schematic illustrations of FIGS. 5 and 6, shown is an exemplary flow diagram representing steps that may be carried out to implement display functionality of the electronic device 12. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The beginning logical operations of the approach of FIG. 7 are the same as the beginning logical operations of the approach of FIG. 4. Therefore, the illustrated blocks representing logical operations in FIG. 7 that are the same as logical operation from FIG. 4 are labeled using the same reference numerals and, for the sake brevity, will not be described in detail. The logical operations that are common to the approaches of FIGS. 4 and 7 include the display of content in block 24, the determination of whether a new GUI element 40 is to be displayed in block 26, the detection of user hand location and establishment of obstructed and unobstructed areas 30, 32 in block 28, and the determination of whether the default location 36 for the new GUI element 40 is in or overlaps with the obstructed area 30 in block 34.

In the embodiment of FIG. 7, if a positive determination is made in block 34 (e.g., as illustrated by FIG. 5), the logical flow will return to block 28 to continue to monitor the relative positioning of the user's hand with respect to the display 14 and continue to determine if the default location 36 for the new GUI element 40 is obstructed. Therefore, if the default location 36 is and continues to be obstructed, the new GUI element 40 will not be displayed. Display of the new GUI element 40 will be deferred until the user moves his or her hand so that the default location 36 for the new GUI element 40 is no longer obstructed so as to result in a negative determination in block 34. Upon a negative determination in block 34, the logical flow proceeds to block 44. In block 44, the new GUI element 40 is displayed in the default location 36 for the new GUI element 40 (e.g., as illustrated by FIG. 6). Thereafter, the logical flow may return to block 26.

In the case of a toast or other user interface object that has a time-out (e.g., a point in time at which the object is removed from the display 14), the display of the new GUI element 40 also may include a change in the time-out of the new GUI element 40. For example, the measurement of the time-out of the new GUI element 40 in these circumstances may commence from the time that the new GUI element 40 is displayed in an unobstructed manner. Therefore, a time-out timer may start at the initial display of the new GUI element 40 if it is displayed in the unobstructed area 32 or may start at the moment that the user moves his or her hand from obstructing the new GUI element 40 if the new GUI element 40 is displayed in the obstructed area 30.

In one embodiment, the approach of FIGS. 5-7 may be used when the new GUI element 40 is a toast and the approach of FIGS. 2-4 may be used when the new GUI element 40 is a dialog box, menu, or other GUI object that does not automatically disappear (e.g., become removed from the display 14 without user action) after a predetermined prior of time. In a variation to this approach, toasts may be placed in two categories depending on the content forming part of the toast. A first category includes toasts to display in the default location 36 as long as the default location 36 is not obscured (e.g., the approach of FIGS. 5-7). An exemplary type of toast for the first category is the announcement of an incoming text message. A second category includes toasts to display in the unobstructed area 32 without waiting for the user to move (e.g., the approach of FIGS. 2-4). An exemplary type of toast for the second category is the announcement of an incoming telephone call.

Alternatives and modifications to the foregoing approaches may be made. In one embodiment, the new GUI element 40 is displayed in its default location and, when the default location 36 is obstructed, the user is alerted to the presence of the new GUI element by changing an appearance of the displayed visual content in the unobstructed area 32 of the display 14. The change in appearance of the unobstructed area 32 may take a variety of forms, such as adding an icon, a pop-up, or an arrow pointing to the new GUI element 40, changing a color scheme, etc. In another embodiment, a tactile or audio signal may be output when the new GUI element 40 is displayed in its default location and the default location 36 is obstructed. The tactile signal may be, for example, vibration of the electronic device 10 with a vibrator device.

In still another embodiment, if a determination that a new GUI element 40 (especially a toast) is to be displayed, a detection of the user's eye gaze is made. Detection of the user's eye gaze includes at least detecting that the user looking at the display 14. More advanced detection may include detection of the direction of the eye gaze to determine where on the display 14 the user's visual attention is directed. Eye gaze detection may be made using a front facing camera 45 that is also used to conduct video calls and take self-portraits of the user. If the user's attention is directed at the display 14, the new GUI element 40 will be displayed. Otherwise, the display of the new GUI element 40 may be deferred until a determination is made that the user is looking at the display 14.

Returning to FIG. 1, other aspects of the electronic device 12 will be described. In one embodiment, the electronic device 12 is configured to engage in wireless communications, such as voice calls, video calls, data transfers, and the like. Data transfers may include, but are not limited to, receiving streaming content, receiving data feeds, downloading and/or uploading data (including Internet content, video files, etc.), receiving or sending messages (e.g., chat-style messages, electronic mail messages, multimedia messages), and so forth. In one embodiment, the electronic device 12 communicates with a subscriber network 46 through an access point (e.g., WiFi access point) or a base station 48 (e.g., cellular telephone tower). Internet 50 access may be attained via the subscriber network 46. The scriber network 46 may include a support server 52 for managing calls placed by and destined to the electronic device 12, transmitting data to and receiving data from the electronic device 12, and carrying out other support functions.

The electronic device 12 includes communications circuitry that enables the electronic device 12 to establish communication connections. In the exemplary embodiment, the communications circuitry includes a radio circuit 54. The radio circuit 54 includes one or more radio frequency transceivers and an antenna assembly (or assemblies). Since the electronic device 12 is capable of communicating using more than one standard, the radio circuit 54 represents each radio transceiver and antenna needed for the various supported connection types. The radio circuit 54 further represents any radio transceivers and antennas used for local wireless communications directly with another electronic device, such as over a Bluetooth interface.

The electronic device 12 may include user inputs 56 for controlling operation of the electronic device 12 in addition to the touch input 30. Exemplary user inputs 56 include, but are not limited to, one or more buttons, one or more motion detectors (e.g., gyro sensors, accelerometers, etc.), and so forth.

As indicated, the electronic device 12 includes the primary control circuit 20 that is configured to carry out overall control of the functions and operations of the electronic device 12. The processor 22 of the control circuit 20 may be a central processing unit (CPU), microcontroller or microprocessor. The processor 22 executes code stored in a memory (not shown) within the control circuit 20 and/or in a separate memory, such as the memory 18, in order to carry out operation of the electronic device 12. The memory 18 may be, for example, one or more of a buffer, a flash memory, a hard drive, a removable media, a volatile memory, a non-volatile memory, a random access memory (RAM), or other suitable device. In a typical arrangement, the memory 18 includes a non-volatile memory for long term data storage and a volatile memory that functions as system memory for the control circuit 20. The memory 18 may exchange data with the control circuit 20 over a data bus. Accompanying control lines and an address bus between the memory 18 and the control circuit 20 also may be present. The memory 18 is considered a non-transitory computer readable medium.

The electronic device 12 may further include a sound circuit 58 for processing audio signals. Coupled to the sound circuit 58 are a speaker 60 and a microphone 62 that enable a user to carry out telephone conversations using the electronic device 12, make voice inputs, and hear sounds generated in connection with other functions of the device 12. The sound circuit 58 may include any appropriate buffers, encoders, decoders, amplifiers and so forth.

The display 14 may be coupled to the control circuit 20 by a video circuit 64 that converts video data to a video signal used to drive the display 14. The video circuit 64 may include any appropriate buffers, decoders, video data processors and so forth.

The electronic device 12 may further include one or more input/output (I/O) interface(s) 66. The I/O interface(s) 66 may be in the form of typical electronic device I/O interfaces and may include one or more electrical connectors for operatively connecting the electronic device 12 to another device (e.g., a computer) or an accessory (e.g., a personal handsfree (PHF) device) via a cable. Further, operating power may be received over the I/O interface(s) 66 and power to charge a battery of a power supply unit (PSU) 68 within the electronic device 12 may be received over the I/O interface(s) 66. The PSU 68 may supply power to operate the electronic device 12 in the absence of an external power source.

The electronic device 12 also may include various other components. For instance, a position data receiver 70, such as a global positioning system (GPS) receiver, may be present to assist in determining the location of the electronic device 12. A rear-facing camera 72 may be present to capture still images and video of scenes facing the side of the electronic device 12 opposite the display 14. Video and still images captured by the camera 72 or the camera 45 may be stored in the memory 18.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
  a display that displays visual content to a user of the electronic device;
  a touch input disposed over the display and configured to receive touch inputs from the user that are interactive with the visual content, the touch input configured to detect location of the user's hand relative to the display including location of the user's hand in front of and not touching the touch input; and
  a controller, the controller configured to control the display of the visual content, including:
    determine an obstructed area of the display that is obstructed from viewing by one or more portions of the user's hand that does not make physical contact with the touch input, wherein the obstructed area comprises a polygon enclosing the detected location of the user's hand relative to the display;
    determine that a default location for the display of a new graphical user interface (GUI) element that should be added to the display overlaps with the obstructed area by at least a predetermined amount, display of the new GUI element prompted by operation of the electronic device apart from actions taken by the user; and
    change a manner in which the new GUI element is displayed so as to improve user visibility of the new GUI element, wherein the change in the manner in which the new GUI element is displayed is moving the location of where on the display that the new GUI is displayed from the default location to a location that is not obstructed by the one or more portions of the user's hand that do not make physical contact with the touch input.

2. The electronic device of claim 1, wherein the obstructed area is determined by generation of a plot of the locations of the user's hand relative to the display.

3. The electronic device of claim 1, wherein the new GUI element is one of a dialog box, a menu, or a temporary popup that times-out and disappears.

4. The electronic device of claim 3, wherein the new GUI element is a temporary popup that times-out and disappears that announces an incoming call.

5. The electronic device of claim 1, wherein the touch input is a capacitive touch input and the location of the user's hand in front of and not touching the touch input is determined by changes in capacitance that are detected by the touch input.

6. A method of displaying visual content with an electronic device, comprising:
  displaying the visual content to a user of the electronic device on a display of the electronic device;
  receive touch inputs from the user that are interactive with the visual content with a touch input that is disposed over the display, and detecting location of the user's hand relative to the display including location of the user's hand in front of and not touching the touch input; and
  controlling the display of the visual content, including:
    determining an obstructed area of the display that is obstructed from viewing by one or more portions of the user's hand as indicated by the detecting of the location of the user's hand that does not make physical contact with the touch input, wherein the obstructed area comprises a polygon enclosing the detected location of the user's hand relative to the display;
    determining that a default location for the display of a new graphical user interface (GUI) element that should be added to the display overlaps with the obstructed area by at least a predetermined amount, display of the new GUI element prompted by operation of the electronic device apart from actions taken by the user; and
    changing a manner in which the new GUI element is displayed so as to improve user visibility of the new GUI element, wherein the changing in the manner in which the new GUI element is displayed is moving the location of where on the display that the new GUI is displayed from the default location to a location that is not obstructed by the one or more portions of the user's hand that do not make physical contact with the touch input.

7. The method of claim 6, wherein the obstructed area is determined by generation of a plot of the locations of the user's hand relative to the display.

8. The method of claim 6, wherein the new GUI element is one of a dialog box, a menu, or a temporary popup that times-out and disappears.

9. The method of claim 8, wherein the new GUI element is a temporary popup that times-out and disappears that announces an incoming call.

10. The method of claim 6, wherein the touch input is a capacitive touch input and the location of the user's hand in front of and not touching the touch input is determined by changes in capacitance that are detected by the touch input.

\* \* \* \* \*